Figure 1:
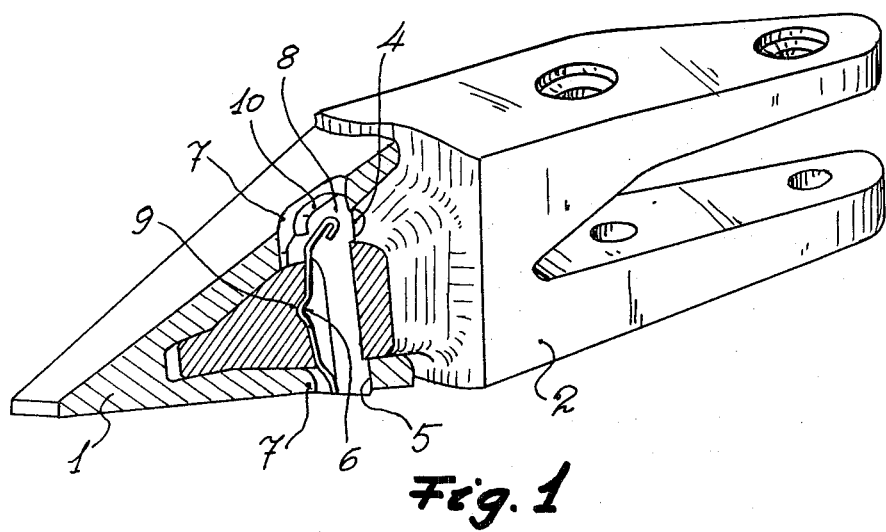

United States Patent [19]
Von Mehren

[11] 3,832,077
[45] Aug. 27, 1974

[54] DEVICE FOR FIXING TEETH TO TOOTH HOLDERS IN EARTH-MOVING MACHINES

[75] Inventor: Juan Puertas Von Mehren, Barcelona, Spain

[73] Assignee: Elementos Para Traccion Y Excavaction, S.A. (E.T.E.S.A.), Madrid, Spain

[22] Filed: July 18, 1972

[21] Appl. No.: 272,731

[30] Foreign Application Priority Data
July 20, 1971 Spain .................................. 171,010

[52] U.S. Cl. .............................. 403/379, 37/142 A
[51] Int. Cl. ............................................. F16b 7/00
[58] Field of Search .. 287/103 D, 20.92 E, 20.92 K; 306/1.5, 103, 119; 85/8.3; 175/413; 37/142 A

[56] References Cited
UNITED STATES PATENTS
2,904,908  9/1959  Ratkowski ......................... 37/142 A
3,106,256  10/1963  McBride ............................ 85/8.3 X
3,520,224  7/1970  Hensley et al. ........................ 85/8.3

FOREIGN PATENTS OR APPLICATIONS
565,417  11/1944  Great Britain .................... 37/142 A Primary Examiner—James R. Boler
Assistant Examiner—Wayne L. Shedd
Attorney, Agent, or Firm—Dean Sandford

[57] ABSTRACT

The most important characteristic of this invention consists of the employment of a cotter pin of a special form that tends to endow it with maximum elasticity, which is housed in the conjugated cavity of the toothholder, while it rests on the tooth, thus acting as a fixing element and a shock-absorbing element simultaneously, permitting an automatic fit, which absorbs the wear and tear that may be produced by working stresses.

5 Claims, 3 Drawing Figures

DEVICE FOR FIXING TEETH TO TOOTH HOLDERS IN EARTH-MOVING MACHINES

The present invention refers to an improved system of fixing to one another teeth and tooth-holders for earth-moving machines.

The purpose of this invention is to ensure a perfect fit, secure fixing and easy replacement of the teeth that are coupled to the tooth-holders of earth-moving machines, and to permit the replacement, without the need to scrap the whole of the excavator element, of the part subjected to greatest wear and tear, that is to say the end part of the complex.

At the present time, the said replaceable part is fixed by means of normal cotter pins or bolts, iron against iron, in a rigid manner, which elements, because of being submitted to a continuous stress, easily develop play in their housing, which produces their premature wear and tear.

The most important characteristic of this invention consists of the employment of a cotter pin of a special form that tends to endow it with maximum elasticity, which is housed in the conjugated cavity of the tooth-holder, while it rests on the tooth, thus acting as a fixing element and a shock-absorbing element simultaneously, permitting an automatic fit, which absorbs the wear and tear that may be produced by working stresses.

In order to facilitate the interpretation of the invention, in the annexed drawings, complementary to the present exposition, there is shown a practical form for its industrial implementation, which is included merely with an informative character and consequently is not limitative with respect to the invention.

FIG. 1 shows a perspective view of a complex of tooth and tooth-holder to which the device which concerns it is applicable.

The tooth (1) is shown fitted to the tooth-holder (2) with the aid of the device consisting of conjugated male and female elements, which are in current use.

The element (3) is the cotter pin, the subject of the present invention, with two perfectly differentiated parts: one (4), essentially plane, which rests on the corresponding zone (5) of the housing in the tooth-carrier, and the other, by means of an inserted piece with a curved surface (6), arranged in such a way as to permit it to be easily introduced through the upper and lower housings (7) of the tooth until reaching a position in which its end plane parts (8) rest on the corresponding planes of the housings (7) of the tooth, while this central curved part (6) fits into another concave conjugated surface (9) arranged in the tooth-carrier (2) in front of the plane zone (5) of the said tooth-carrier.

Figure 2:
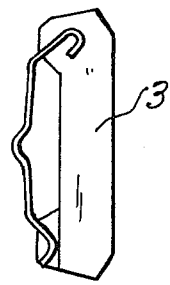
Figure 3:
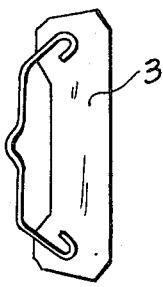

The introduction of the cotter pin (3) until it reaches the situation of FIGS. 1 and 2 is made possible by the deformation of the element (6) in the form of a laminated spring which is firmly embedded at one end in the element (4) while the other end can have a relative sliding movement, thus facilitating its elastic deformation.

An alternative arrangement, which is also claimed, is that of fixing both ends by embedding, the element (6) being fixed like an arch to the element (4), it being capable of being deformed in the central curved zone.

The profile of the curved surface that the element (6) presents can be centered with respect to the total length of the cotter pin (3) or can be displaced towards an end of the said length in order to facilitate its elastic deformation in the operation of penetration until it occupies its final position.

The zones (10) of the element (4) or base of the cotter pin are arranged so as to resist the stresses created by hammering it to introduce it into its housings.

The most important function of the complex constituting the subject of the present description is the execution of the element (4) in synthetic non-metallic material, of the type of acetate resin, polyamide, etc., of great resistance to wear and tear by abrasion, free from corrosion, with excellent characteristics for withstanding dry friction while it is being assembled, and with excellent mechanical characteristics to receive one or the two ends of the laminated spring (6) and to support the assembly stresses.

For its part, the laminated spring (6) is executed in a material with a high index of elasticity in order to fulfil its mission as an element of elastic retention and to comply with the deformation imposed by the assembly and the conjugated dimensions of the curved zones (6) and (9) of the cotter pin (3) and the tooth-carrier (2).

Thus, steel of high elasticity, of the type used in springs and hoops, should preferably be employed, while for certain applications bands or sheets of beryllium copper can be used to avoid any possibility of oxidation which would make dismantling difficult. Again, according to the conditions of employment, the element (6) can be made an integral part of the element (4), being made of the same material, and the two pieces can thus be manufactured simultaneously in a single operation.

The nature of the invention having been sufficiently described, together with an example of its practical implementation, it only remains to add that in the parts described it is possible to introduce modifications, changes of material, conjugated forms of the profiles of cotter pin and housing, etc, provided that such alterations does not imply a substantial variation of the invention.

What is claimed is:

1. A pin for securing a tooth to the tooth-carrier of an earth moving machine, said tooth having a female cavity adapted to receive a protruding conjugated male portion of the tooth-carrier, and said pin being insertable through a pair of apertures in said tooth and a mating slot in said tooth-carrier, said pin comprising a rigid body member constructed of a corrosion resistant synthetic plastic material of high mechanical strength having a plane surface adapted to bear against a plane surface in each of said apertures in said tooth and a deformable element attached to said body member on the opposite side of said body member from said plane surface, said deformable element having a curved surface adapted to engage a concave conjugated surface of said tooth carrier.

2. The device defined in claim 1 wherein one end of said deformable element is fixedly imbedded in said body member and the other end of said deformable element is free to move relative to said body member.

3. The device defined in claim 1 wherein both ends of said deformable member are fixedly imbedded in said body.

4. The device defined in claim 1 wherein said body member and said deformable element are integrally formed of said corrosion resistant synthetic plastic material.

5. The device defined in claim 4 wherein both ends of said deformable element are fixedly attached to said body member.

* * * * *